United States Patent
Milton

[11] Patent Number: 5,417,617
[45] Date of Patent: May 23, 1995

[54] NOISE-SUPPRESSED PULLEY

[75] Inventor: Randy K. Milton, 2014 Grafton Rd., Elyria, Ohio 44035

[73] Assignee: Randy K. Milton, Elyria, Ohio

[21] Appl. No.: 253,621

[22] Filed: Jun. 3, 1994

Related U.S. Application Data

[63] Continuation of Ser. No. 125,617, Sep. 23, 1993, abandoned, which is a continuation of Ser. No. 867,755, Apr. 13, 1992, abandoned.

[51] Int. Cl.$^6$ .............................................. F16H 57/04
[52] U.S. Cl. ...................................... 474/93; 474/205
[58] Field of Search ................... 474/93, 152, 153, 164, 474/204, 205, 273, 902; 198/834

[56] References Cited

U.S. PATENT DOCUMENTS

| | | | |
|---|---|---|---|
| 440,040 | 11/1890 | Jones . | |
| 605,104 | 6/1898 | Knoblock . | |
| 1,385,396 | 7/1921 | Rayburn | 474/93 |
| 1,629,154 | 5/1927 | Ybarrondo . | |
| 2,933,935 | 4/1960 | Sterkel . | |
| 4,018,096 | 4/1977 | Foster | 74/230.01 |
| 4,416,649 | 11/1983 | Kohrn | 474/153 |
| 4,509,933 | 4/1985 | Miranti, Jr. et al. | 474/93 |
| 4,545,778 | 10/1985 | Koivula | 474/153 |
| 4,571,224 | 2/1986 | Arinaga | 474/153 |
| 4,913,687 | 4/1990 | Soots | 474/167 |

FOREIGN PATENT DOCUMENTS

| | | | |
|---|---|---|---|
| 3124320 | 1/1983 | Germany | 474/152 |
| 52-44372 | 7/1977 | Japan . | |

Primary Examiner—Ramon S. Britts
Assistant Examiner—Roger J. Schoeppel
Attorney, Agent, or Firm—Watts, Hoffmann, Fisher & Heinke

[57] ABSTRACT

A noise-suppressed timing belt pulley and a method of making the same is disclosed. The pulley has a toothed face for engaging a toothed timing belt and a pair of flanges for guiding the belt. Air holes are formed in the flanges in positions aligned with the spaces between the teeth of the pulley. Air passages are formed in the rim of the pulley. A channel is formed in the valleys between adjacent teeth between and connecting the air passages. The combination of air holes in the flanges, air passages formed in the rim and the channels formed in the tooth valleys greatly reduces the noise generated by an operating timing belt transmission.

4 Claims, 3 Drawing Sheets

NOISE-SUPPRESSED PULLEY

This application is a continuation of application Ser. No. 08/125,617, filed Sep. 23, 1993, now abandoned, which is a continuation of application Ser. No. 07/867,755, filed Apr. 13, 1992, now abandoned.

BACKGROUND OF THE INVENTION

1. Field of the Invention

The present invention relates to power transmission pulleys, and more particularly, to timing belt pulleys with noise-suppressing features.

2. Description of Related Art

V-belt drive systems are known to be less efficient than timing belt (toothed) drive belt systems. This is chiefly due to belt slippage in V-belt systems. The teeth on the timing belt and pulley prevent such slipping in timing belt systems. In some applications, a 5–10% energy savings may be achieved by replacing a V-belt drive system with a timing belt drive system. This energy savings is very significant in high-power transmission systems.

When it is desirable to use a timing belt power transmission in applications where high speeds and high power transmission are required, relatively wide belts must be used. However, such wide belts create significant noise problems in the form of a loud whistle. This noise is believed to be caused by the rapid escape of air trapped between the pulley and the belt where the pulley teeth engage belt teeth and the reverse effect where the belt disengages from the pulley.

In many hospitals, high horsepower belt drive transmissions are used to drive fans which ventilate the air in the rooms. Ventilation of hospital room air is particularly important to reduce the number of airborne viruses and bacteria. Special requirements put forth by the Joint Commission on Accreditation of Health Care Organizations specify the minimum number of total air exchanges per hour for hospital rooms. For example, the air in trauma rooms, operating rooms and delivery rooms must be exchanged at least 15 times each hour requiring a great deal of power. Thus, hospitals typically employ the very highest powered belt transmissions available for driving their ventilation fans. A small increase in efficiency in these systems will result in a large economic return.

While hospital ventilation systems provide a particularly good application for higher-efficiency timing belts, in many cases, timing belt transmissions cannot be used due to their greater noise generation. The noise generated by a large timing belt transmission may be transmitted some distance through the air ducts to the patients' rooms. In one hospital, a newly installed timing belt transmission had to be replaced with a less-efficient V-belt transmission as a result of complaints of patients and hospital personnel.

Several attempts have been made to overcome the problem of noise in timing belts. In one proposal, the pulley was provided with a peripheral section made of sintered, porous metal. The trapped air between the belt and the pulley was permitted to escape through the pores in the metal. This proposal was expensive and difficult to manufacture.

Several proposals for curing the noise problem are disclosed in U.S. Pat. No. 4,545,778. Several pulley constructions are shown in this patent which purport to reduce noise by permitting air trapped between the pulley and the belt to escape via passages formed in the pulley face. A model similar to the pulley of FIG. 11 in the aforementioned patent was tested by the present inventor. This model provided some noise reduction at some noise frequencies as compared to a standard timing pulley, but failed to provide enough noise reduction for many hospital and other noise-sensitive installations. In particular, this model failed to satisfactorily decrease noise levels over a wide range of disturbing noise frequencies.

SUMMARY OF THE INVENTION

Basically, the pulley comprises a hub adapted to be rotatably connected to a shaft, a rim connected to the hub having a face for engaging a belt and a pair of flanges for retaining the belt on the face. A plurality of uniformly spaced teeth are arranged on the face for engaging a cooperating pattern of teeth on the belt. A plurality of valleys are formed between adjacent teeth on the face, each valley having a floor. The flanges have a plurality of holes formed therein in positions aligned with the valleys for connecting the valleys to the atmosphere. A plurality of passages are formed in the pulley for connecting the valleys to the atmosphere. Each valley has plurality of passages and each passage connects one of a plurality of openings in the valley floor with an associated one of a plurality of openings in the rim. Additionally, the preferred form of the pulley has a channel formed in each valley floor radially inward of the valley floor for forming an air passage between and connecting the valley floor openings.

BRIEF DESCRIPTION OF THE DRAWINGS

A preferred embodiment of the invention are shown in the accompanying drawings in which.

DESCRIPTION OF THE PREFERRED EMBODIMENT

Figure 1:
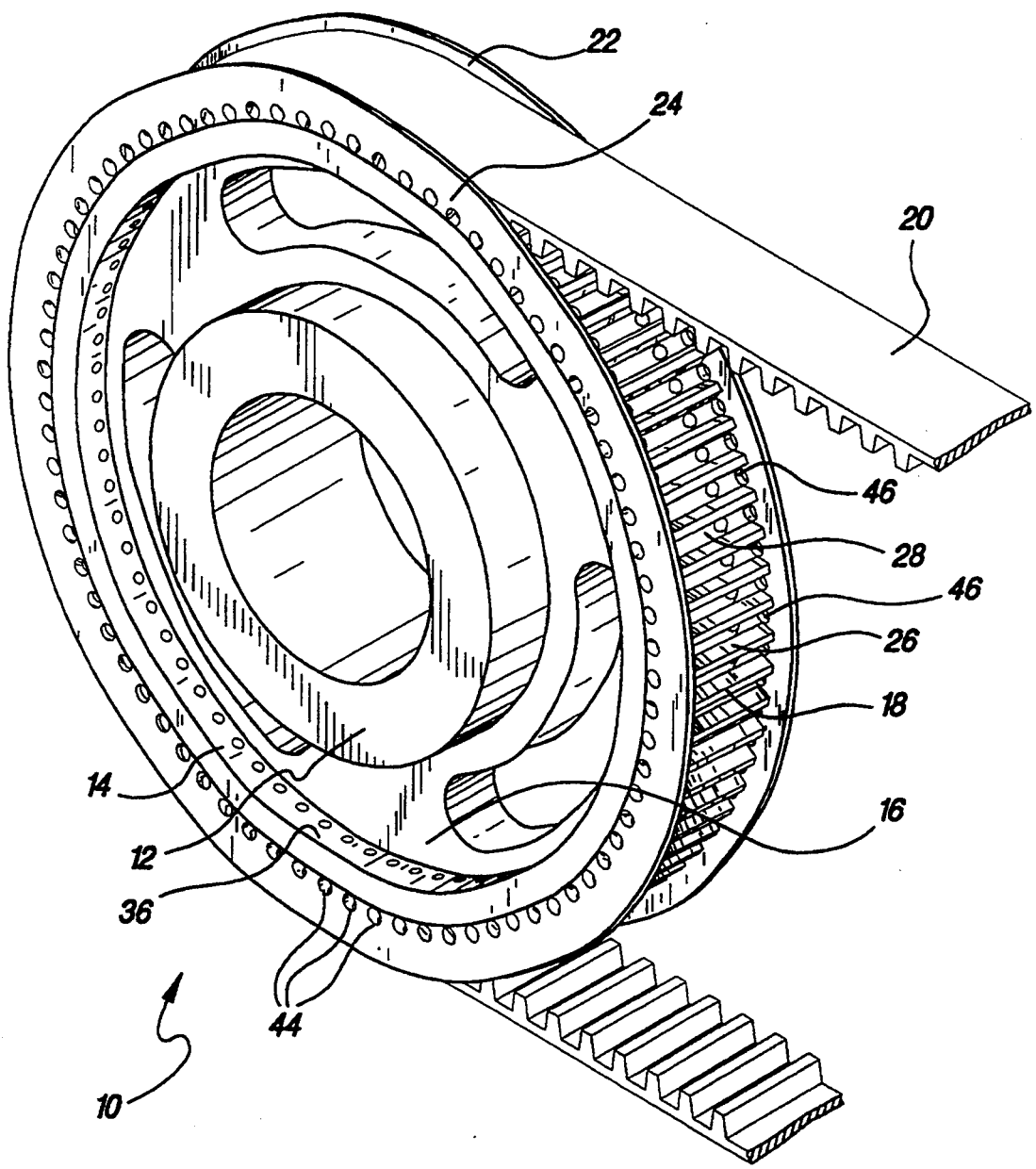
FIG. 1 is a perspective view of the pulley of the present invention engaging a belt.

Referring to FIG. 1, the pulley 10 has a hub 12, a rim 14, and a plurality of arms 16 connecting the hub 12 and the rim 14. The rim 14 includes a face 18 for engaging an endless timing belt 20. A pair of flanges 22, 24 are joined to the sides of the rim 14 to retain the belt 20 on the face. The belt 20 engages one or more similar pulleys (not shown) to transmit power from one rotating shaft to another.

Figure 2:
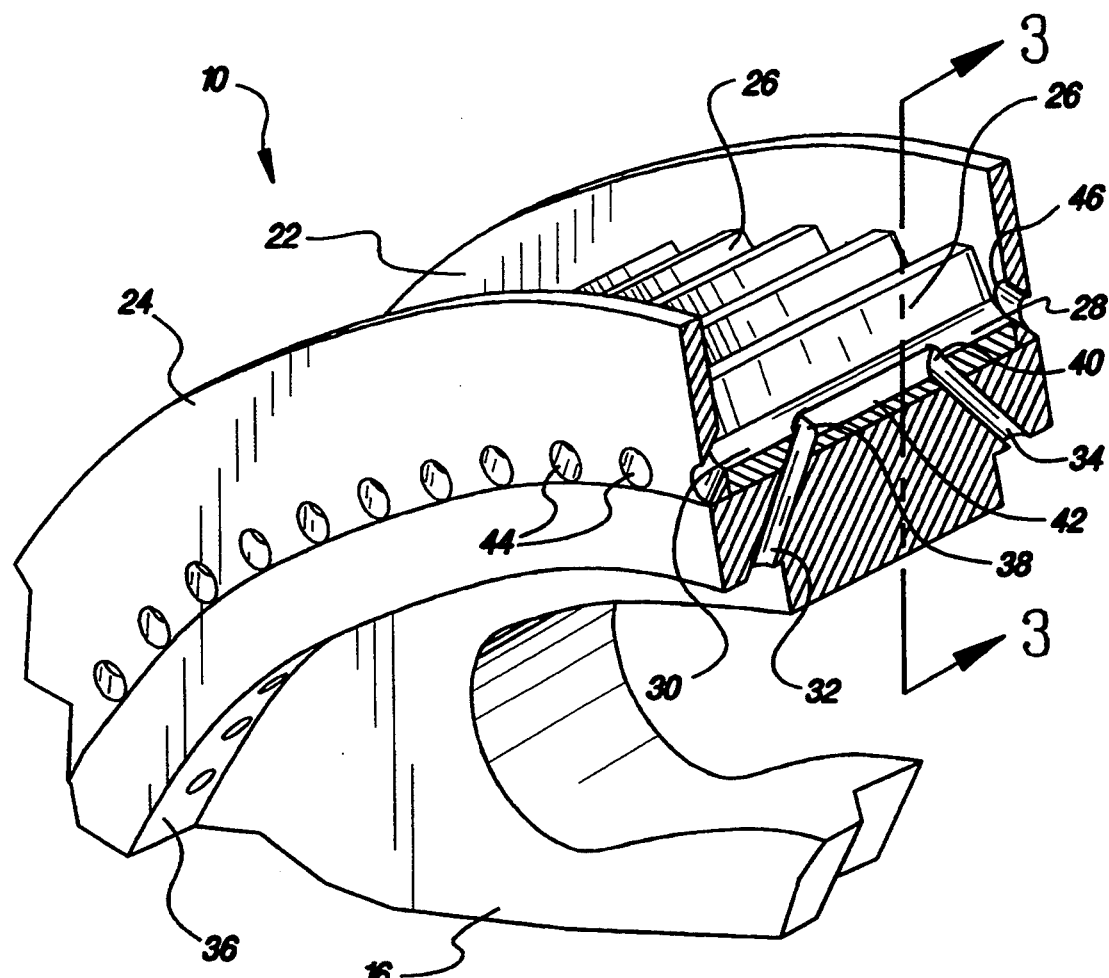
FIG. 2 is a fragmentary perspective view cut in cross section of the pulley of FIG. 1.

Referring to FIG. 2, the face 18 of the pulley 10, or the belt engaging surface, includes the plurality of uniformly spaced teeth 26. Between every two adjacent teeth 26 is a space or valley 28 which is occupied by a belt tooth during part of the pulley's revolution. Each valley 28 includes a floor region 30 which is the bottom most or radially innermost section of the valley 28. A plurality of air passages 32, 34 are formed in the rim 14 to connect each valley 28 to the atmosphere permitting compressed air trapped between the belt 20 and the pulley face 18 to escape where the belt 20 first engages the pulley face 18. Additionally, the passages 32, 34 permit air from the atmosphere to enter where the belt 20 is separating from the pulley face 18.

Rim air passages 32, 34 are formed through the rim between the valley floor 28 and an inner rim surface 36 of the pulley 10. In the preferred embodiment, two rim air passages 32, 34 are formed in each valley 28. Openings 38, 40 for the rim air passages 32, 34 are formed in each valley floor 30 at two locations, each spaced from the pulley flanges 22, 24 as illustrated in FIG. 2. The openings 38, 40 in the preferred embodiment are located so as to divide the valley floor 30 into three sections of approximately equal length.

A channel 42 is formed in each valley floor 30 for forming an air passage between and connecting the two floor openings 38, 40. The channel 42 serves to vent compressed air trapped beneath the belt to the two openings 38, 40 or to supply air to the valleys 28 when the separation of the belt from the pulley creates a vacuum. In the preferred embodiment, the channel 42 is approximately 0.035 in. deep as measured from the floor 30 and approximately 0.075 in. wide.

Figure 3:
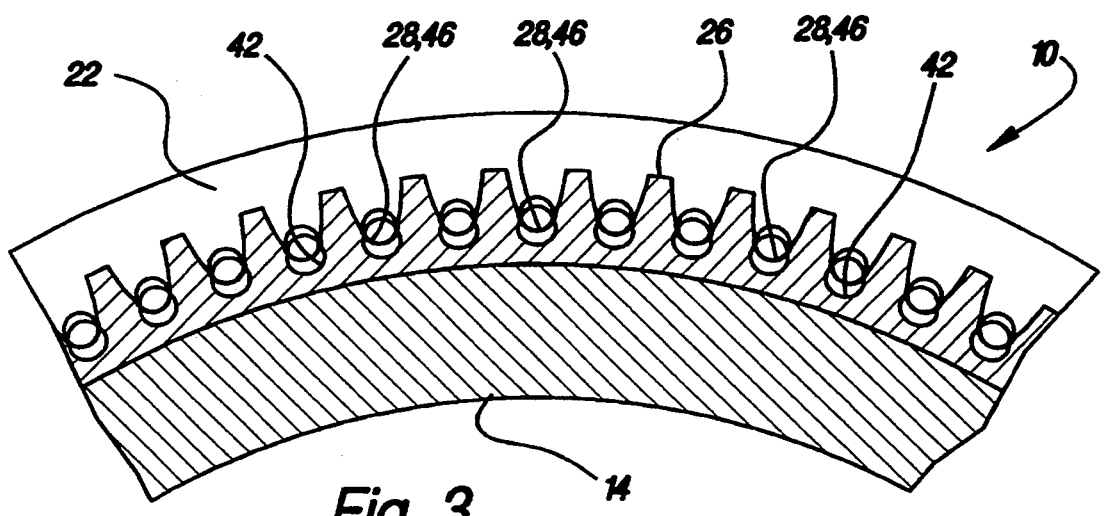
FIG. 3 is a fragmentary cross sectional view as viewed approximately from the plane indicated by the line 3—3 in FIG. 2.

Holes 44, 46 are formed in the flanges 22, 24 at each end of each valley 28 to provide further ventilation outlets for compressed air trapped in the valleys 28 and inlets for inrushing air. The floor 30 of each valley 28 is directly aligned with the flange holes 44, 46 as illustrated in FIG. 3.

Thus, in theory, when the belt first engages the pulley, compressed air from the sections of the valleys 28 nearest the flanges 22, 24 will be vented to the atmosphere through the nearby flange holes 44, 46. Compressed air from the center of the valleys 28 will be vented to the atmosphere through the openings 38, 40 and the passages 32, 34. Where the belt leaves the pulley, a vacuum is created in each valley 28 and the opposite effect is believed to occur. Testing of this pulley configuration has resulted in significant noise reductions as compared to prior art pulley configurations making installation in noise-sensitive buildings possible. Thus, it is now possible to take advantage of the higher efficiency of timing belt transmissions in noise-sensitive applications such as hospitals.

The preferred method of forming the noise suppressed pulley is to perform a series of machining steps on a conventional ranged timing belt pulley. The flange holes 44, 46 are drilled in the flanges 22, 24 in locations corresponding to the locations of the valleys. The holes 44, 46 are preferably drilled from the inside of the flange outward. This allows for accurate placement of the holes 44, 46 with respect to the valleys 28 and it prevents metal burrs from being formed near the belt-engaging face 18. The holes 44, 46 are drilled at an angle to the pulley axis for manufacturing convenience. The preferred hole size is 0.075 in.

The passages 32, 34 are drilled from the valley toward the inner rim surface 36. Again, this direction avoids metal burrs on the pulley face 18. The preferred hole size for the passages is 0.075 in. The angle of the passages 32, 34 is chosen for manufacturing convenience. A milling machine is used to form the channel 42 between and connecting the openings 38, 40.

Figure 4:
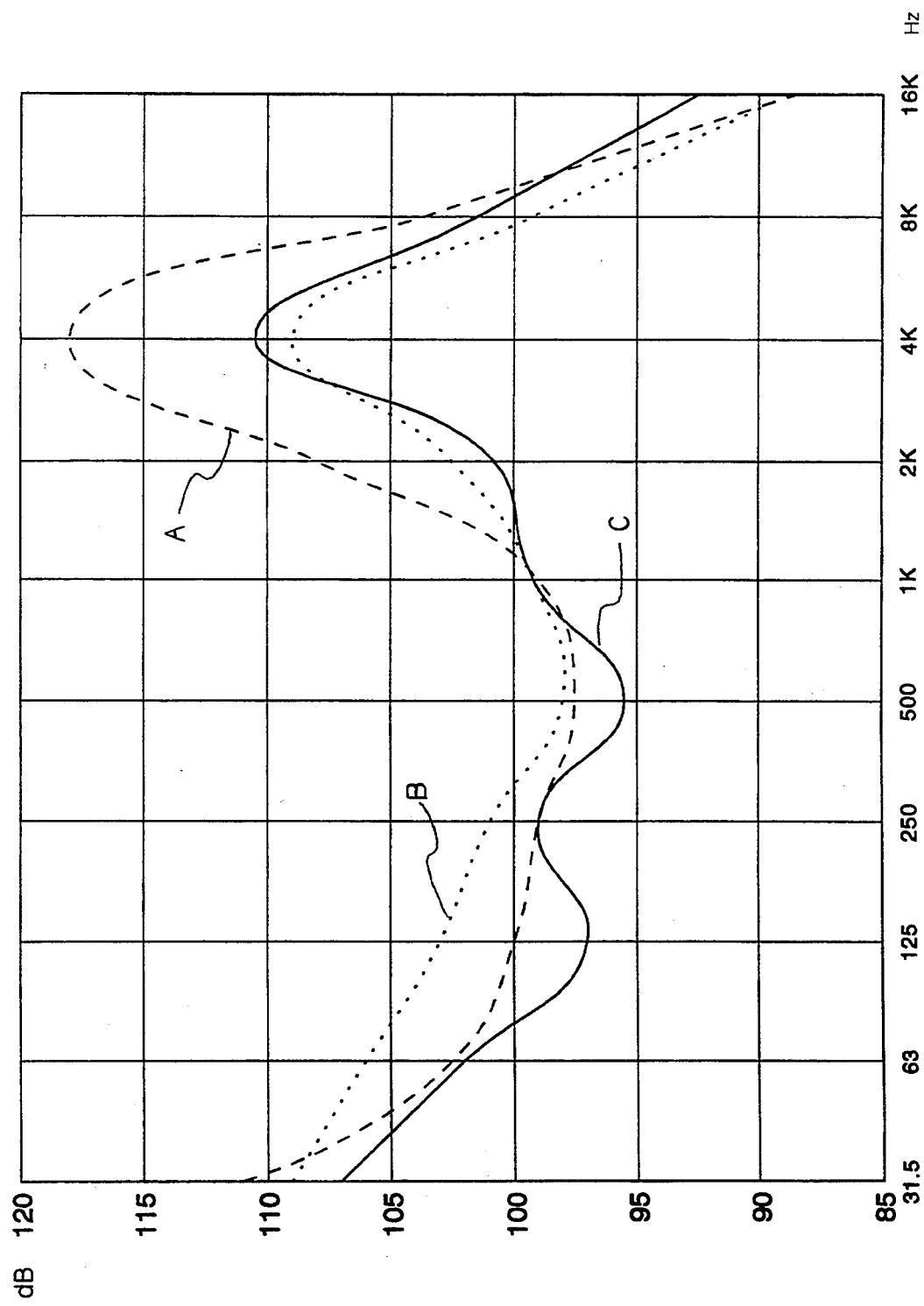
FIG. 4 is a graph showing curves representing measured noise as a function of measured noise frequency for three different pulleys.

Referring to FIG. 4, three curves are shown which represent sound measurements recorded by a hand-held sound level meter. The measurements reflected in FIG. 4 were taken proximate to a high-horsepower fan transmission in operation. The meter used was a "GEN-RAD" model 1988. A first curve designated by the letter A represents recorded noise levels for a standard ranged timing pulley having no noise suppression features. A second curve designated by the letter B represents recorded noise levels for a ranged pulley modeled after the pulley shown in FIG. 11 of U.S. Pat. No. 4,545,778. A third curve designated by the letter C represents recorded noise levels for the pulley 10 of the present invention. In each case the noise sensor was directed toward the loudest portion of the belt transmission; that is, a position proximate to where the belt comes into engagement with or separates from the pulley.

The curves A,B,C of FIG. 4 show that the pulley 10 of the present invention (curve C) achieves significant noise reduction as compared to a standard pulley and a prior art pulley over most of the measured frequency range. Noise at frequencies near 2000 HZ is most harmful to humans. Therefore, it is significant that the pulley 10 produces a significantly lower noise near 2000 HZ as seen in FIG. 4. It was found that variation of the diameter of the flange holes 44, 46 and the passages 32, 34 affects the level of noise at certain frequencies. The dimension of 0.075 in. for the flange holes 44, 46 and the diameter of passages 32, 34 is preferred as producing reduced noise level at frequencies near 2000 HZ.

While a preferred embodiment of this invention has been described in detail, it will be apparent that certain modifications or alterations can be made without departing from the spirit and scope of the invention set forth in the appended claims.

I claim:

1. A pulley for use with a timing belt, said pulley comprising:
    a hub for connection to a rotatable shaft for rotation therewith;
    a rim attached to the hub;
    a plurality of uniformly spaced teeth arranged in a circumferential array in said rim for engagement with a cooperating pattern of teeth on a timing belt;
    a valley formed between an adjacent pair of teeth, each said valley having a floor;
    a pair of passages extending through said rim, each passage fluidly connecting one valley floor to atmosphere at a location radially inward of said valley floor; and
    a channel formed in each valley floor at a location radially inward of said valley floor and only extending axially between said pair of passages.

2. A pulley according to claim 1 further including a pair of flanges for retaining the timing belt on a face of said rim, said flanges having a plurality of axially extending passages, each axially extending passage in fluid communication with a respective one of said valleys for connecting each axial end of said valley to atmosphere.

3. A pulley for use with a timing belt, said pulley comprising:
    a hub for connection to a rotatable shaft for rotation therewith;
    a rim attached to the hub;
    a plurality of uniformly spaced teeth arranged in a circumferential array in said rim for engagement with a cooperating pattern of teeth on a timing belt;
    a valley formed between an adjacent pair of teeth, each said valley having a floor;
    at least one passage extending through said rim, said passage fluidly connecting one valley floor to atmosphere at a location radially inward of said valley floor; and a channel formed in each valley floor at a location radially inward of said valley floor and in fluid communication with said passage, said channel at a location other than at the axial ends of said valley floor and having an axial extent less than the axial extent of said valley floor.

4. A pulley according to claim 3 further including a pair of flanges for retaining the timing belt on a face of said rim, said flanges having a plurality of axially extending passages, each axially extending passage in fluid communication with a respective one of said valleys for connecting each axial end of said valley to atmosphere.

* * * * *